United States Patent Office 3,424,897
Patented Jan. 28, 1969

3,424,897
MECHANICAL COMPUTER RESULTANT INDICATING DEVICE
Cesare Marchesini, Miami, and Walter R. Hogg and Robert I. Klein, Hialeah, Fla., assignors to Coulter Electronics, Inc., Hialeah, Fla., a corporation of Illinois
Filed Dec. 8, 1965, Ser. No. 512,334
U.S. Cl. 235—92                    6 Claims
Int. Cl. G06f 7/38

This invention relates to particle analysis apparatus and more particularly to a mechanical computer resultant indicating device for facilitating the translation of particle indicating signal data to form a more readily useful in portraying the relations among the particles represented by indicating signals. This invention discloses a device for useful cooperation with apparatus of a copending application Ser. No. 410,882, entitled, Automatic Particle Size Data Converting Apparatus, filed Nov. 13, 1964, and assigned to an assignee common with the assignee of this application.

In that former application there was disclosed and claimed automatic particle size data converting apparatus. This so disclosed apparatus was arranged for advantageous cooperation with particle sizing and counting apparatus of the type universally accepted as the Coulter Counter. This type apparatus is disclosed, inter alia, in Wallace H. Coulter Patent 2,656,508, granted Oct. 20, 1953.

This patented apparatus provided facile and precise information on the number of particles in a suspension under study and provided this information at a rate to outstrip the capabilities of human operators to correlate this information to best advantage. In accordance with the aforementioned application, there were disclosed methods and apparatus for presenting voluminous data of the type derived, as from the aforementioned Coulter apparatus, in mathematically related arrays in order to enhance the interpretation capability of this information.

Figure 6:
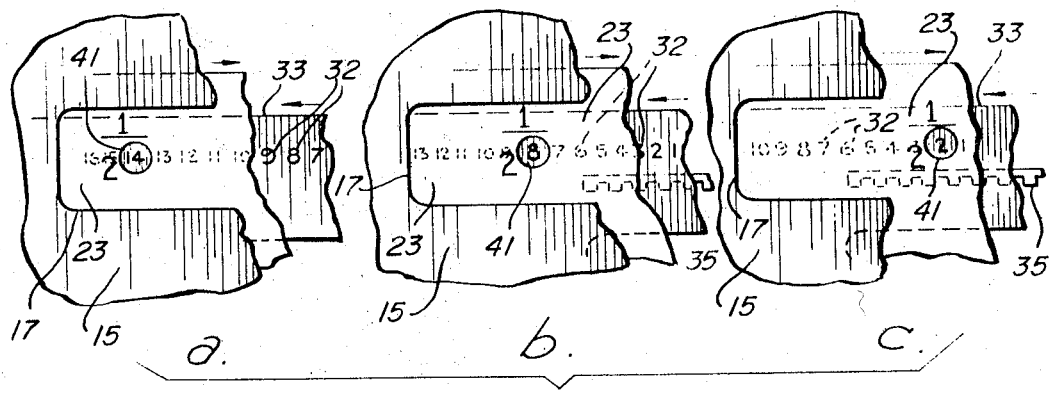

The former noted application disclosed a requirement for a mechanical indicating device such as the indicator 68 shown in the block diagram of FIG. 6 in that former application. It is accordingly a principal object of the present invention to provide a mechanical indicator adapted for cooperation with arrangements of the aforementioned application mechanically to effect numerical particle indications for enabling effective presentation of information concerning particles under study. Thus, it is desired to provide apparatus for operating on raw particle indicating signals prior to presentation on display portions of analysis apparatus to enable prompt, coherent display of analysis count information. Such information may representatively be distribution of quantity of particulate material in relation to size and/or distribution of quantity of particulate material above a stated size.

Another important object of the invention is to provide a novel resultant indicating device of the character described utilizing a novel mechanical coupling arrangement for showing the desired resultant operating factor which is to affect the particle count indicated by the so-called Coulter apparatus.

Another object of the invention is to provide a mechanical indicating device of the character described which will enable mathematical operation on counts being made by a Coulter apparatus within respective ranges dictated by the apparatus and, also, the keeping of an accurate record of the resultant operating factor being applied by the device.

The foregoing and other objects of the invention will occur to the skilled artisan from the ensuing disclosure in which a preferred embodiment of the invention is described and illustrated in detail. Minor variations in arrangement and construction of parts may occur without sacrificing any of the advantages of the invention.

Figure 1:
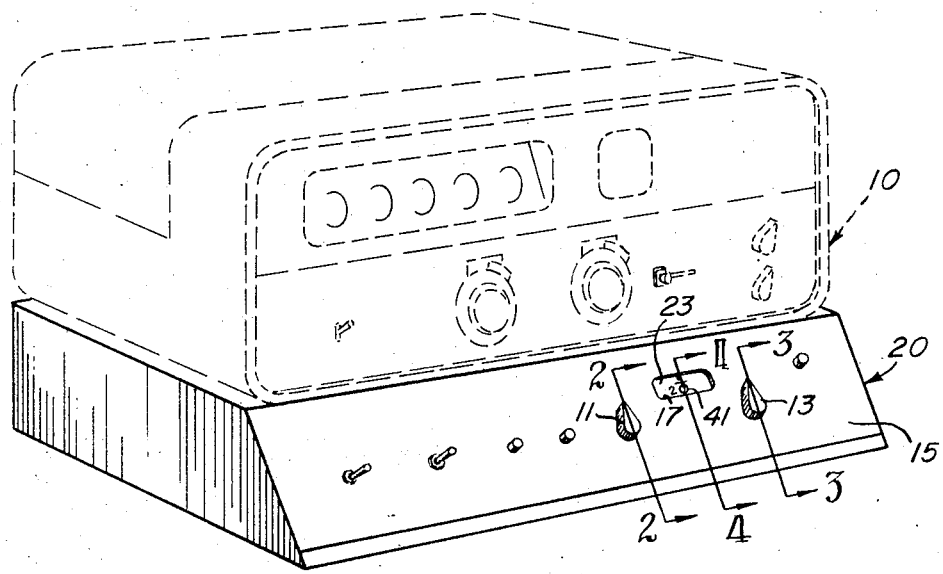
Figure 2:
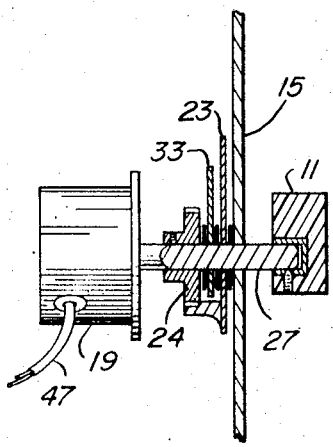
Figure 4:
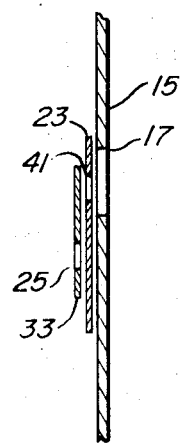
Figure 3:
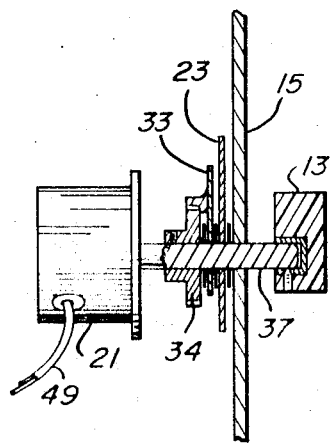
Figure 5:
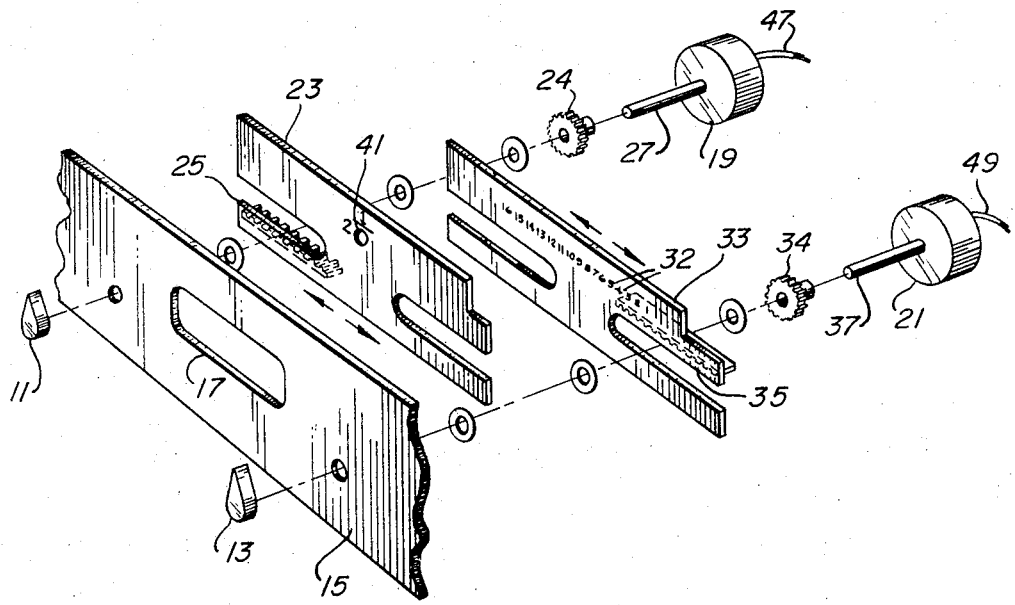

In the drawings:
FIG. 1 is a perspective view of the mechanical resultant indicating device embodying the invention shown associated with a Coulter type particle analyzing apparatus illustrated in phantom outline.
FIG. 2 is a sectional view taken along the line 2—2 of FIG. 1 and in the general direction indicated.
FIG. 3 is a sectional view taken along the line 3—3 of FIG. 1 and in the general direction indicated.
FIG. 4 is a sectional view taken along the line 4—4 of FIG. 1 and in the general direction indicated.
FIG. 5 is a fragmentary exploded view of the resultant indicating device embodying the invention.
FIG. 6 is comprised of three parts, a, b, and c, which are fragmentary elevational views, respectively, of the dial or operating panel of the device illustrating different readings and with portions broken away to show details in each instance.

The invention is supported by a housing configured and adapted for mounting in association with particle counter apparatus. This housing mounts first and second manually rotatable knobs for introducing a suitable adjustment factor, indicated definitively by a rotatable dial beneath a window disposed in a respectively associated housing face. The two adjustment knobs each are rotatably mounted on a shaft bearing the operating arm of a suitable multiple contact switch. These switches are arranged electrically between the particle pulse generator and the particle count indicator familiar in apparatus to the Coulter type. The contacts of these switches are suitably connected with networks of the aforementioned Coulter apparatus to effect, respectively, limitation of the time of a count and to effect an appropriate multiplication or division of the counts passed to the display unit of the cooperating counting apparatus.

These switch contacts are connected internally, in the one case, to series connected resistors of appropriate values for applying a suitable multiplying factor of two to signals passed therethrough. In the other case, those switch contacts are connected internally to taps between a chain of series connected binary units.

Thus, in an illustrative case, the rotary switch contacts are positioned between resistors of 0.5 M (megohm), 0.5 M, 1 M, 2 M and 4 M. Thus, a signal applied to the cumulative switch resistance of 8 M is multiplied by factors of $\frac{1}{16}$, $\frac{1}{8}$, $\frac{1}{4}$ and $\frac{1}{2}$ at successive switch contact positions.

In the other rotary switch the contacts are associated with a train of simple binary units. Hence, the resultant signals translated through this order switch are similarly and selectively affected by an inverse power of two.

It is noted here that this "affecting," whether it be by an inverse, negative power of two or a normal, positive power of two, is simply "multiplying" for simplicity in language.

Positioned within the housing are suitable indicator scale arrangements corresponding, in large measure, functionally to the mechanical operating resultant factor structure shown in FIG. 9 of the aforementioned application. These arrangements of the invention are housed conveniently for disposition in association with particle counting apparatus and lend facility both in operation and interpretation of indications derived from the associated particle counting apparatus.

Referring now more particularly to the drawings, in FIG. 1 there is shown a portion of a well-known Coulter Counter particle signal processing apparatus 10 in operating assembly with a mechanical computer resultant indicating device 20, in accordance with the invention. In the apparatus 10, as discussed in the aforementioned application, there are derived in a first portion, particle indicating signals. In a second portion of the apparatus 10, these signals are displayed as counts in appropriate windows. These display windows are indicated in dashed lines but not designated numerically. By operation of the appropriate knob, of the two dashed line illustrated knobs on the face of the apparatus 10, a desired particle size range is selected for processing in the apparatus 10 and subsequently displayed as a numerical indication in the windows provided.

As is evident in FIG. 1, the computer resultant indicating device 20, in accordance with the invention, is provided with a housing configured for convenient physical nesting with a Coulter Counter 10.

Appearing mounted on the front face 15 of the device are first and second selection knobs 11 and 13 a time factor knob and a weighting factor knob, respectively, having functions which will be more clear from consideration of FIGS. 2–5 below. The housing front face 15 includes a window 17 beneath which a first slider index plate 23 is viewably positioned and arranged for transverse movement parallel to the front face. This slider is provided with a numerical multiplying factor indication "½" adjacently positioned to a designating aperture 41.

The designating aperture 41 is provided for cooperation with graved markings on a second indexed slider 33, not shown in FIG. 1 but considered hereafter in connection with FIG. 5. Through this designating aperture 41, an operating factor, e.g. an exponent, is selected for display from among an array 32 of successive such factors graved on plate 33.

Manual rotation of knobs 11, 13 accomplishes selective indication of and application of appropriate operating factors to the particle counts derived and indicated by the apparatus 10. This is accomplished by introduction of a selected knob angular position into the circuitry for the counter apparatus 10. This will be seen in connection with discussion of FIGS. 2–4 hereafter.

These FIGS. 2–4 are sectioned, partial elevation views of the structure of FIG. 1, corresponding respectively to the section indications of that FIG. 1.

In FIG. 2, corresponding to section 2—2 of FIG. 1, there is shown the manually operable selection knob 11, a time factor knob, fixed to a rotary shaft 27 by a conventional set screw, not designated numerically. This time factor knob is associated with appropriate resistor arrangements for multiplying the input particle signal on lead 47 by a selected inverse factor of two before passage of this signal to the count display in the dashed line indicated windows of apparatus 10. The shaft 27 passes through front face 15 to select appropriate inter resistor contacts of series connected resistors included within time factor switch housing 19. Immediately adjacent front face 15 is parallel slider, index plate 23 and, immediately to the left, is a second, cooperative index plate, slider 33. These sliders are adapted for movement toward and away from the plane of the drawings by operation of conventional mechanical arrangements associated with shafts 27 (and 37) upon rotary operation of knob 11 (and 13).

In FIG. 3 analogous arrangements for knob 13 are illustrated. Hence knob 13 is shown fixed in rotation to a rotary shaft 37 which passes, as shown, through the front face 15. This shaft 37 is arranged mechanically for selecting electrical contacts among plural series connected binary units within housing 21, for selectively applying input particle indicating signals to the display window of apparatus 10 after these signals have been adjusted in number by a factor of two in dependence upon the number of binary units selected. Thus, operation of knob 11 permits selective adjustment of displayed particle number indications in accordance with the duration of a sampling interval allotted to a particular sampling observation. At the same time the displayed particle count is affected by another factor of two corresponding to rotation of knob 13 in consonance with the correlation of particle size examined in a pertinent sample under observation to the total number of particles in that sample.

Looking next to FIG. 4 there is seen in sectioned elevation view an indicated portion of the apparatus 20 of FIG. 1. Here the front plate 15 is shown having the viewing window 17 therein. The parallel positioned indexed first slider plate 23, having a designating aperture 41 therein, is positioned proximate the second parallel indexed plate 33. This latter, second plate is adapted by a slotted portion 25 for movement perpendicular to the plane of the drawing in response to operation of knob 11.

The operative relationship of these structural elements appears more clearly from consideration of the exploded view of FIG. 5. Here the operating rotary selector knobs 11, 13 are shown in association with rotary shafts 27, 37. These shafts, as shown, pierce front facing plate 15 for respective connection in driving relation to contact selectors for the series resistor and binary unit networks in housings 19, 21. These series networks, in turn, are respectively provided with signal transmitting leads 47, 49. These signals of course are no more than the adjustments to the observed particle indicating signals which are translated through resistor networks and binary unit connections in housings 19, 21.

Pinion gears 24, 34, are provided for fixing on shafts 27, 37 for cooperation with illustrated rack arrangements in the slotted portions 25, 35 of first and second slider index plates 23, 33. These slotted portions 25, 35, as appears from consideration of the geometric relationships of shafts 27, 37 to the parallel plates 23, 33, adapt these plates for free translation parallel to the front plate 15. Undesignated spacer rings are provided for mounting on shafts 27, 37 to enable free movement of the two parallel slider index plates 23, 33 along the front face 15.

The second index plate 33 comprises an array 32 of plural consecutive digits 1–16, arranged for selective viewing through designating aperture 41 in the plate 23. The particular one of the plural digits designated from the array 32 is established as visible in the designating aperture 41 by a defined relative longitudinal positioning of the two index plates 23, 33. That is to say, clockwise rotation of knob 11 moves index plate 23, illustratively, to the left along array 32.

This is effected by rotation of pinion 24 to the left in engagement with the rack portion of the slotted portion 25 of plate 23. Simultaneously, clockwise rotation of knob 13 may illustratively move plate 33 to the right by engagement of pinion 34 with the rack in the slotted portion 35 of index plate 33. Thus, a selected index number, arbitrarily for illustration, the digit 7, is moved into designated relation with aperture 41. In this fashion defined rotations of both knobs 11, 13 bring the designating index number 7, from the consecutive array 32 of such numbers on plate 33, into viewed relation through designating aperture 41. This viewed relation definitively establishes the precise rotation of knobs 11, 13. These precise rotations, by virtue of the indication of the factor "½" on plate 23 and the viewably positioned exponent 7, in aperture 41, indicate a precise multipyling factor for particle indications at apparatus 10.

For each successively large composite multiplying factor, a comibnation of threshold settings and sensitivity adjustments are established such that particles of the size range larger in volume by the same factor are registered by the apparatus 10, thus causing the display portion of this apparatus to show a number proportional to the total particulate material in that size range.

Turning next to FIG. 6, there are seen three enlarged partial sections of the indicating plates 23, 33 showing in greater detail representative orientations of the several indicating elements in accordance with the invention. In part a of FIG. 6 the index plate 33 is moved relatively right to bring the number "14" into view through designating aperture 41 in index plate 23. The array 32 of consecutive index numerals on plate 23 is indicated by phantom lines within the confines of viewing window 17 positioned appropriately in the face of housing 15.

Next, in part b of FIG. 6 the several index plate relations are illustrated in the situation that the plate 23 is moved right in relation to plate 33 such that the numeral "8" is selected for viewing through designating aperture 41.

In the third situation part c of FIG. 6 the index plate 23 is moved right, relative to plate 33. Thus, the exponent indicating digit "2" is viewed through the designating aperture 41. These exponent indicating digits selected for viewing through aperture 41, of course, are selectively positioned for this viewing by rotation of an appropriate pinion, not shown, in engagement with a rack portion 35 of the index plate 33. This rack portion is shown both in parts b and c of FIG. 6 in partial phantom, partial functional relation with principal portions of plate 33.

The invention has been described above in one illustrative embodiment for advantageous cooperation with particle analysis apparatus of the types disclosed, for example, in U.S. Patent 2,656,508 and disclosed and claimed in U.S. Patent 3,259,842, issued July 5, 1966 by Wallace H. Coulter et al. and assigned to the same assignee as the instant application.

Numerous and varied departures from the single described embodiment of the invention will readily occur to one skilled in the art without departing from the spirit and scope of the invention.

What is sought to be secured by Letters Patent of the United States is set forth in the appended claims:

1. A mechanical computer resultant indicating device for employment with a particle analysis apparatus having a first portion for deriving signals indicative of particles and a second portion for displaying numerical indications of particles analyzed, said device comprising: means for translating derived particle indicating signals from said apparatus for actuating the display portion thereof, said translating means including first and second selectively operable means jointly coupled to be interposed between the apparatus portions, said first means comprising a selectively tapped network for applying multiplying factors to indicating signals for translation to the apparatus second portion, and said second means having selectively tapped network connections for independently applying cooperative multiplying factors in translation of signals to the apparatus second portion, and an operating factor display arrangement operated cooperatively by said first and second operable means for indicating the combined operating factor applied to said indicating signals in passage to the apparatus second portion.

2. A device as set forth in claim 1 wherein said last named display arrangement comprises a first index plate having an array of consecutive designating digits disposed thereon, and a second index plate having a designating aperture therein for movement in parallel relation with said array of digits in response to operation of said first and second selectively operable means.

3. A device as set forth in claim 2 wherein said first and second index plates are movable in parallel relation respectively responsive to operation of said first and second operable means.

4. A device as set forth in claim 2 wherein said first and second operable means comprise first and second rotatable operating knobs having first and second rotatable shafts, and gear linking means respectively associating said shafts with said index plates, whereby designated ones of the digits of said array are indicative of rotation of both said operating knobs.

5. A device for adjusting the display of count indications derived from particle analysis apparatus adapted for deriving particle signals of an amplitude related to the size of indicated particles which device comprises, a first manually rotatable knob, a second manually rotatable knob, drive shafts respectively associated with said knobs, a control network respectively associated with each of said shafts, the control network associated with said first knob being operable for adjusting the amplitude of signals in translation from detecting portions of said analysis apparatus to count display portions thereof, said second knob being operable for introducing selected multiplying factors to the number of particle indicating signals in translation to the display portions of said analysis apparatus, whereby said first knob is selectively operable for applying a selected multiplying factor to displayed particle count indications in accordance with the time duration of a particular analysis operation of said particle analysis apparatus, and said second knob is operable to apply a selected multiplying factor to said displayed particle count indications in accordance with predetermined relations of particle size to cumulative particle volume.

6. A device in accordance with claim 5 and, in combination therwith, a first index plate having a designating aperture, a second index plate having an array of consecutive digits, said array being disposed in parallel relation with said first plate, said first and second plates being independently movable longitudinally in response to rotation of said first and second knobs whereby a designated one of said consecutive digits is visible through said aperture in accordance with multiplying factors jointly applied to said displayed counts by said first and second knobs.

References Cited

UNITED STATES PATENTS

| | | | |
|---|---|---|---|
| 2,465,524 | 3/1949 | Gibson | 338—184 |
| 2,519,752 | 8/1950 | Fox | 338—184 X |
| 2,920,525 | 1/1960 | Appel | 235—92 |
| 2,943,287 | 6/1960 | Kennedy | 338—91 |
| 2,943,288 | 6/1960 | Budd | 338—184 |
| 2,952,777 | 9/1960 | Barnothy | 235—92 |
| 3,170,754 | 2/1965 | Pincus | 200—56 X |

MAYNARD R. WILBUR, Primary Examiner.

G. J. MAIER, Assistant Examiner.

U.S. Cl. X.R.

338—184